(12) United States Patent
Minemura et al.

(10) Patent No.: US 8,144,559 B2
(45) Date of Patent: Mar. 27, 2012

(54) MULTIPLE PULSE RECORDING METHOD WITH 3-VALUED POWER LEVELS

(75) Inventors: Hiroyuki Minemura, Kokubunji (JP);
Tsuyoshi Toda, Kodaira (JP);
Toshimitsu Kaku, Sagamihara (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1166 days.

(21) Appl. No.: 11/761,399

(22) Filed: Jun. 12, 2007

(65) Prior Publication Data

US 2007/0286047 A1     Dec. 13, 2007

(30) Foreign Application Priority Data

Jun. 12, 2006   (JP) .................................. 2006-161782

(51) Int. Cl.
*G11B 5/09*     (2006.01)
(52) U.S. Cl. ..................................... 369/59.11; 369/116
(58) Field of Classification Search .... 369/59.11–59.27, 369/116, 47.5, 47.51, 47.52, 47.53, 13.26
See application file for complete search history.

(56) References Cited

U.S. PATENT DOCUMENTS

| | | | |
|---|---|---|---|
| 5,745,467 A | 4/1998 | Sakaue et al. | |
| 5,802,032 A * | 9/1998 | Jacobs et al. | 369/59.11 |
| 6,678,228 B1 * | 1/2004 | Kando et al. | 369/59.12 |
| 7,675,831 B2 * | 3/2010 | Minemura | 369/59.11 |
| 2002/0114246 A1 * | 8/2002 | Seo | 369/59.11 |
| 2003/0142606 A1 * | 7/2003 | Ogawa et al. | 369/59.11 |
| 2005/0013229 A1 * | 1/2005 | Yokoi | 369/116 |
| 2005/0105438 A1 * | 5/2005 | Hibino et al. | 369/59.12 |
| 2005/0286390 A1 | 12/2005 | Minemura et al. | |
| 2006/0176793 A1 | 8/2006 | Ushiyama et al. | |
| 2006/0215514 A1 | 9/2006 | Watanabe et al. | |

FOREIGN PATENT DOCUMENTS

| | | |
|---|---|---|
| JP | 11-354893 | 12/1999 |
| JP | 2003-187443 | 7/2003 |
| JP | 2004-280891 | 10/2004 |
| JP | 2005-339790 | 12/2005 |
| JP | 2006-221781 | 8/2006 |
| WO | WO 97/14143 | 4/1997 |

* cited by examiner

*Primary Examiner* — Tan X Dinh
(74) *Attorney, Agent, or Firm* — Antonelli, Terry, Stout & Kraus, LLP.

(57) ABSTRACT

Pulses modulated between the erase power and the bottom power are used instead of cooling pulses for an optical disk medium that needs a write strategy with 4-valued power levels. Consequently, pulse instruction lines for the cooling pulses, power level instruction lines, and corresponding current source within the laser driver can be omitted. Decrease in size and lower power consumption can be accomplished.

3 Claims, 9 Drawing Sheets

FIG. 3    (PRIOR ART)

10-40 READOUT SIGNAL LINES (BD, HD-DVD, DVD, CD)
8-16 LASER CONTROL LINES
CONTROL BOARD
OPTICAL HEAD
5-10 POWER SUPPLY-GROUNDING LINES
FPC
4-8 ACTUATOR CONTROL LINES

MULTIPLE PULSE RECORDING METHOD WITH 3-VALUED POWER LEVELS

INCORPORATION BY REFERENCE

The present application claims priority from Japanese application JP2006-161782 filed on Jun. 12, 2006, the content of which is hereby incorporated by reference into this application.

BACKGROUND OF THE INVENTION

The present invention relates to a method of recording information on an optical disk by forming recording marks that are different in physical property from other portions on a recording medium. The invention also relates to laser driving apparatus and optical disk apparatus (hereinafter referred as an optical disk drive).

There are many recordable optical disk media such as CR-R/RW, DVD-RAM, DVD±R/RW, Blu-ray Disk, and HD-DVD. These media including dual-layer media having two recordable layers have enjoyed wide acceptance. Corresponding optical disk drive that are widespread are so-called DVD Super Multi drives corresponding to reading and writing to and from CD-R/RW, DVD-RAM, and DVD±R/RW. It is contemplated that the ultimate Super Multi drive to which functions of coping with Blu-ray Disk and HD-DVD are added will be developed in the future. At the same time, optical disk drive are required to have reduced sizes, lower costs, and reduced power consumption.

In this way, to cope with plural media conforming to different standards, complicated Write Strategies are necessary. One of the write strategies which are most complex today (pulse trains consisting of many power levels) is a write strategy for 4.7 GB DVD-RAM. This is internationally standardized by ISO/IEC DIS 17892:2003. A technique for improving the compatibility of 4.7 GB DVD-RAM write strategies is described in JP-A-2003-187443.

FIG. 2 illustrates a write strategy that is adapted for 4.7 GB DVD-RAM and described in FIG. 1 of the above-cited JP-A-2003-187443. As can be seen from the figure, a pulse train consisting of a first pulse, multiple intermediate pulses, a last pulse, and cooling pulses is used to form one recording mark. With respect to power levels, there are 4 values of power in total. That is, a power level (peak power) for writing is used. A power level (bias power 1) for erasure is used. A power level for the cooling pulses (bias power 2) is used. A power level for the bottom of the intermediate pulses (bias power 3) is used.

There are two major systems which correspond to such write strategies and are adapted for laser driver ICs capable of multi-X speed writing.

The first system is described in JP-A-2005-339790. This uses a laser driver installed on a head. The laser driver incorporates a register for setting of power and a logic circuit for creating pulses. Therefore, fundamentally, control signals are only a clock signal, write data signal (NRZI), and a serial data signal for register I/O. There are the advantages that the number of control signal lines is few and that skew adjustment of pulses is not necessary. However, the circuit configuration is complicated and the power consumption tends to be large.

The second system is described in JP-A-11-354893 and uses a laser driver mounted on a head but the laser driver does not have any large-scale logic circuit. An example of the configuration is shown in FIG. 3. Required control signals include voltage level (which can be current levels) lines for setting laser powers and switching instruction lines for selectively turning on and off current switches corresponding to the power levels to control the pulse widths and the timings. To cope with multi-X speed writing, the switching instruction lines for controlling one current switch consist of one pair of differential signals. As a differential signal system, a well-known LVDS system is used. This system has the disadvantages that there are many control signal lines and that adjustment of skew between the switching instruction lines is required. However, the circuit configuration is simplified. Reduced costs and power consumption can be easily achieved.

SUMMARY OF THE INVENTION

As described previously, there is a demand for a recordable optical disk drive which copes with all of CD-R/RW, DVD-RAM, DVD±R/RW, Blu-ray Disk, and HD-DVD and which achieves miniaturization, lower costs, and lower power consumption.

FIG. 4 is a schematic diagram showing signal lines which are formed on an FPC (flexible printed circuit) and which connects the head of such ultimate Super Multi drive with a main board. In this structure, the second system which is excellent in cost savings and power consumption savings is used as the laser driver IC. It is considered that the number of the signal lines on the FPC is so large that it is difficult to pack the signal lines.

FIG. 5 shows the write strategy for the 4.7 GB DVD-RAM. This is an example of writing pulses for forming marks having a length of 6 Tw, where Tw is a detection time window. There are four necessary power values. On the other hand, as is well known in the art, data can be written to 1×-speed media such as DVD-R and DVD-RW with a write strategy consisting of 2- or 3-valued power levels. Accordingly, if data can be written to the 4.7 GB DVD-RAM with a write strategy consisting of 3-valued power levels, (1) one of the 4 write power current sources within the laser driver IC can be omitted. (2) The corresponding power and the instruction lines for the pulses can be omitted. In consequence, cost, consumed power, and the number of signal lines on the FPC can be reduced at the same time.

The only one choice to reduce one power level is to modify the cooling pulses. Other choices directly modify the shape of the marks. FIGS. 6 and 7 show write strategies in which the power level (bias power level 2) of the cooling pulses of the write strategy shown in FIG. 5 is set to bias powers 1 and 3, respectively.

Currently commercially available 4.7 GB DVD-RAM media have only bias power 2 having the same value as bias power 1. Accordingly, we made experiments on overwriting with 3×-speed using a commercially available, 2×-speed, 4.7 GB DVD-RAM medium to ascertain whether good writing can be done with the write strategies of FIGS. 6 and 7. The reason why the write speed was set to 3× is that the function of cooling pulses is to improve the overwrite performance at the trailing edges of marks.

FIG. 8 shows the results of experiments showing the relationship between peak power and jitter at leading and trailing edges. LM330A manufactured by ShibaSoku Co., Ltd., Japan, was used as an apparatus for making evaluations. 10 overwrite experiments were made at 3× speed. The wavelength of the light used by the installed optical head was 660 nm. The numerical aperture of the objective lens was 0.60. The write strategy of FIG. 6 was used. The power conditions were as follows. The peak power was 12 mW. The bias power 1, bias power 2, and bias power 3 were 5.9 mW, 5.9 mW, and 1 mW, respectively. The duty cycle of intermediate pulses was 50%. The conditions for the first pulse and the last pulse under which marks longer than 6 Tw were formed were set equal to the conditions for 2× speed converted into Tw. The positions of the leading edge of the first pulse and the trailing edge of the last pulse for forming marks of from 3 Tw to 5 Tw were adjusted to minimize the jitter. As can be seen from the figure, the trailing edges suffer from worse jitter than the leading edges. Similar results were obtained when the write strategy of FIG. 7 was used. This is the problem when a write strategy using 3-valued levels is employed.

It is an object of the present invention to provide a small-sized, low-cost, low-power consumption optical disk drive which solves the foregoing problem and which produces good writing characteristics with a write strategy not using a dedicated power control circuit for cooling pulses to thereby reduce the scale of the circuit of the laser driver IC and the number of signal lines on an FPC.

Other objects, features and advantages of the invention will become apparent from the following description of the embodiments of the invention taken in conjunction with the accompanying drawings.

DETAILED DESCRIPTION OF THE EMBODIMENTS

Prior to description of embodiments of the present invention, experiments and analysis made by the present inventors are described. As described previously, there has been the problem that if a 4.7 GB DVD-RAM medium is overwritten with 3-valued pulses, trailing edges suffer from worse jitter. To analyze the factors, thermal simulations and experiments were performed.

Figure 5:
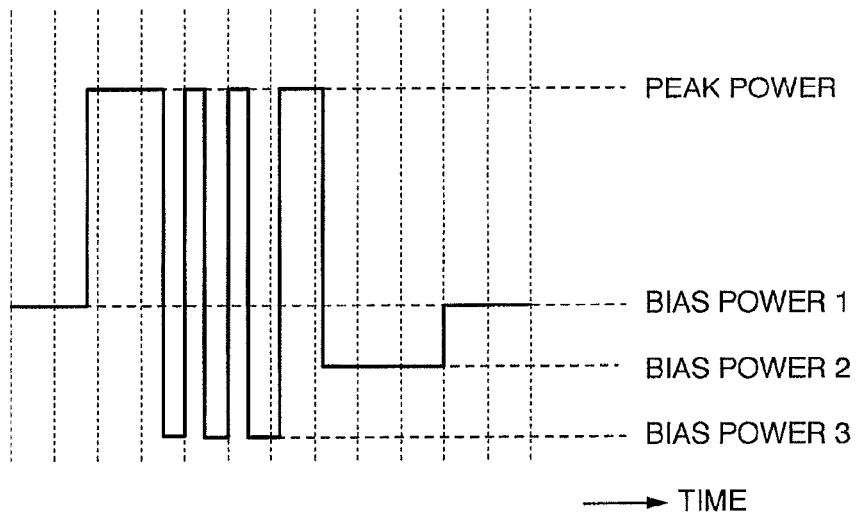
FIG. 5 is a diagram illustrating write pulses used to write a DVD-RAM disk.
Figure 6:
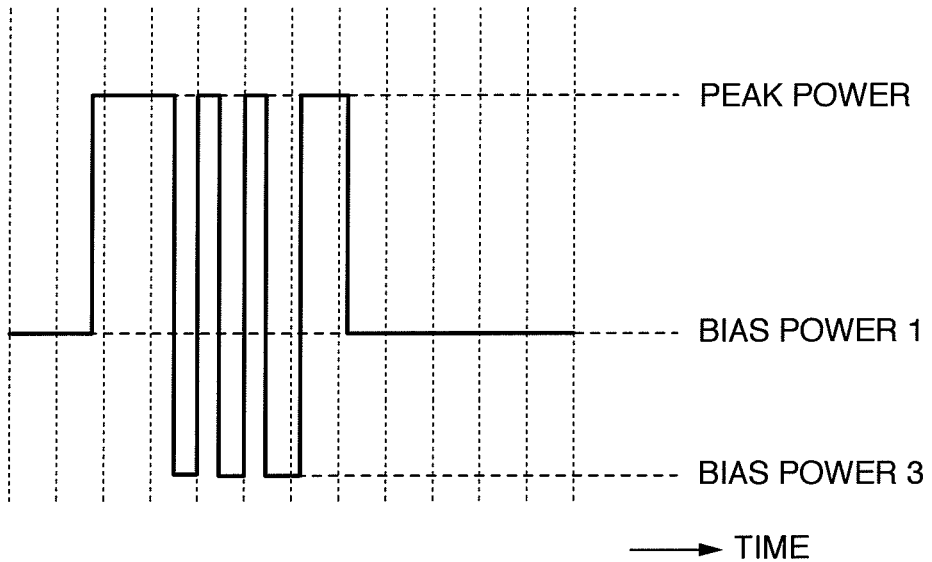
FIG. 6 is a diagram illustrating write pulses with 3-valued power levels.
Figure 7:
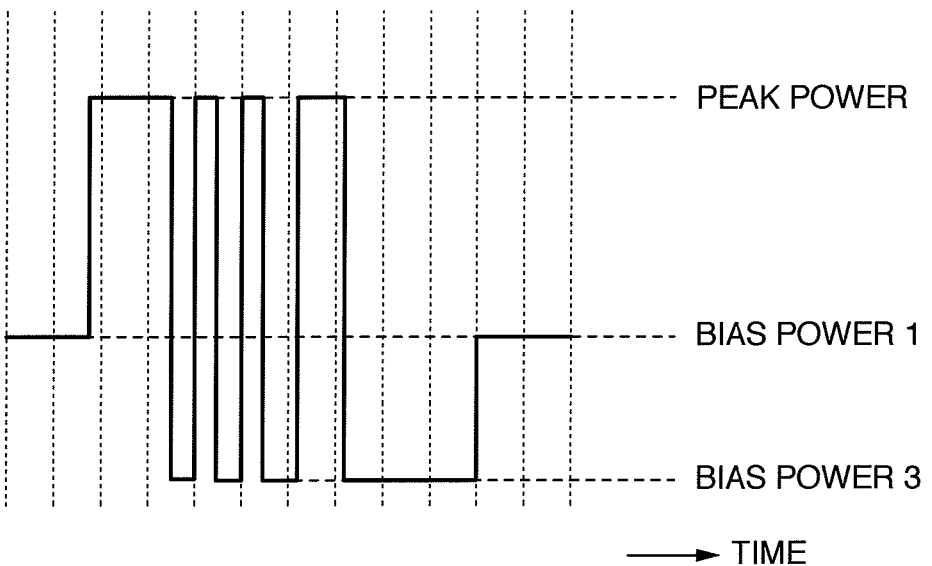
FIG. 7 is a diagram illustrating write pulses with 3-valued power levels.
Figure 8:
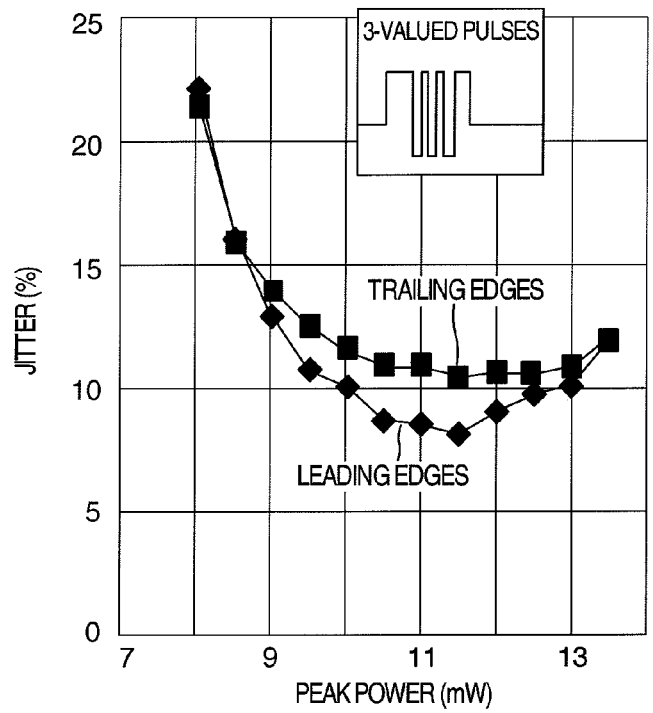
FIG. 8 is a graph showing the results of experiments to investigate the relationship between the write power and jitter when writing was done with write pulses with 3-valued power levels.
Figure 9:
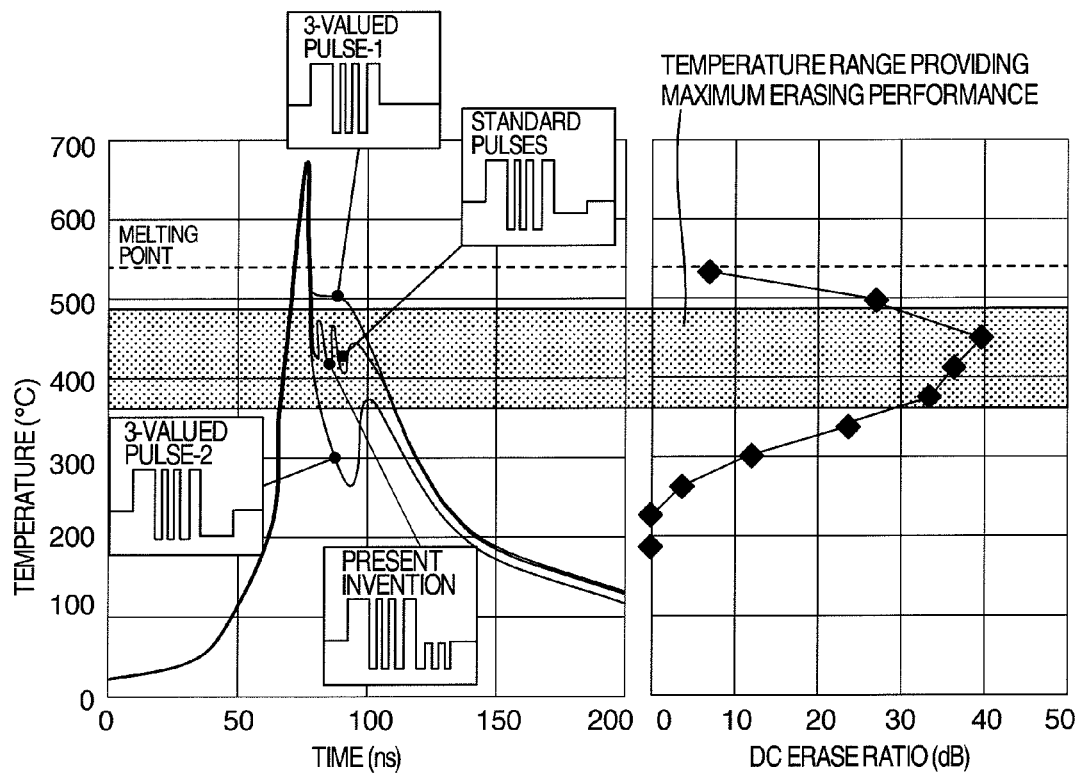
FIG. 9 is a graph showing the results of a simulation indicating temperature hysteresis at the ends of write marks and the crystallization rate.

FIG. 9 shows the results of a calculation of temperature hysteresis at the trailing edges of 3 T marks. Also, experimentally derived relationship between the temperature of the centers of the tracks and the DC erase ratio is shown. The temperature range in which the maximum erasing performance is exhibited (hereinafter may be referred to as the optimum temperature range), i.e., the DC erase ratio is higher than 30 dB, is in the hatched region (about 370 to 490° C.). It can be seen from the results of the thermal simulation that with write strategies (indicated by 3-valued pulse-1 and 3-valued pulse-2, respectively) shown in FIGS. 6 and 7, the erasing performance stays in the optimum temperature range in a shorter time during the cooling process than where the write strategy (indicated by standard pulses) illustrated in FIG. 5 is used. It can be considered that this leaves the trailing edges unerased during overwriting, deteriorating the jitter.

Figure 1:
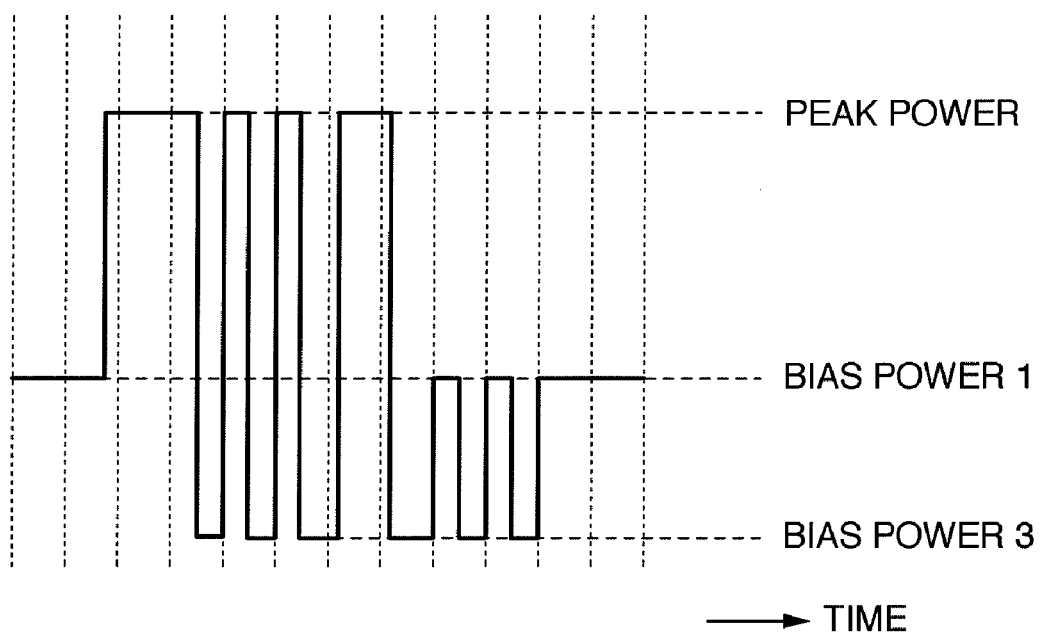
FIG. 1 is a diagram illustrating a writing method according to the present invention.
Figure 2:
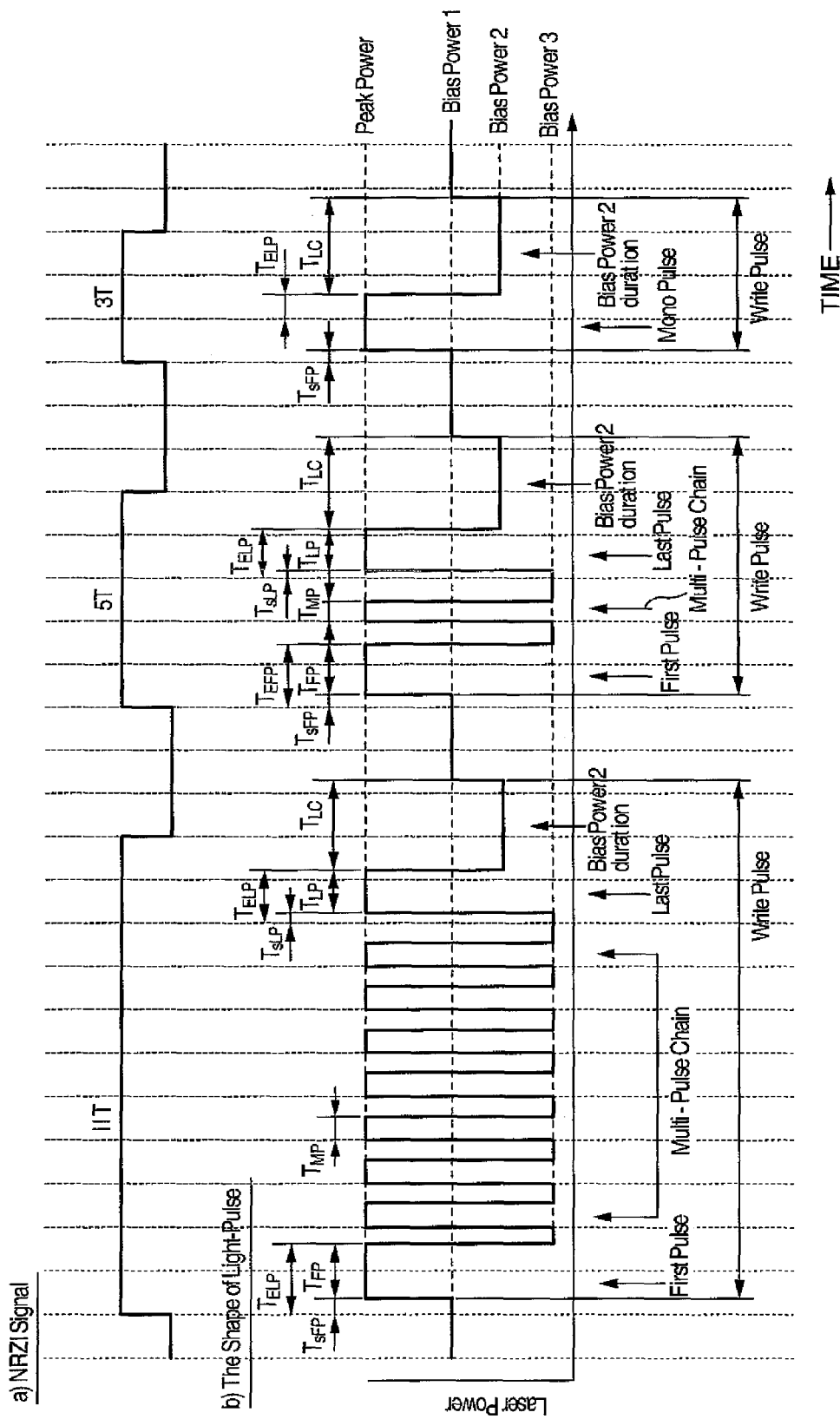
FIG. 2 is a diagram illustrating write pulses used to write a DVD-RAM by a well-known method.

Accordingly, we have devised a write strategy as shown in FIG. 1. A pulse train (hereinafter referred to as the cooling assisting pulse train) modulated between bias power 1 and bias power 3 at intervals of 1 Tw is applied during the period of the cooling pulses. Consequently, the average thermal energy of light pulses applied to the medium during the period of the cooling pulses can be made equivalent to that of the standard pulses. In this case, the average thermal energy can be adjusted by adjusting the duty cycle of the cooling assisting pulse train.

More specifically, in the same way as when the power value of the cooling pulses is determined, conditions under which the overwrite jitter is minimized are found, using the duty cycle of the cooling assisting pulse train as a parameter. As shown in FIG. 9, use of the write strategy according to the present invention makes it possible to give a temperature hysteresis equivalent to that of standard pulses to the medium. Furthermore, the temperature rises and falls repeatedly during the cooling period. Therefore, it can be expected that crystal nuclei of the recording film will be created frequently during temperature decrease and that the crystal nuclei will be grown efficiently during temperature rise. The differences of crystallization mode of phase-change recording materials caused by variations in the temperature in this way are well known characteristics. Since detailed description of the characteristics is beyond the scope of the present invention, the description is omitted herein.

Figure 10:
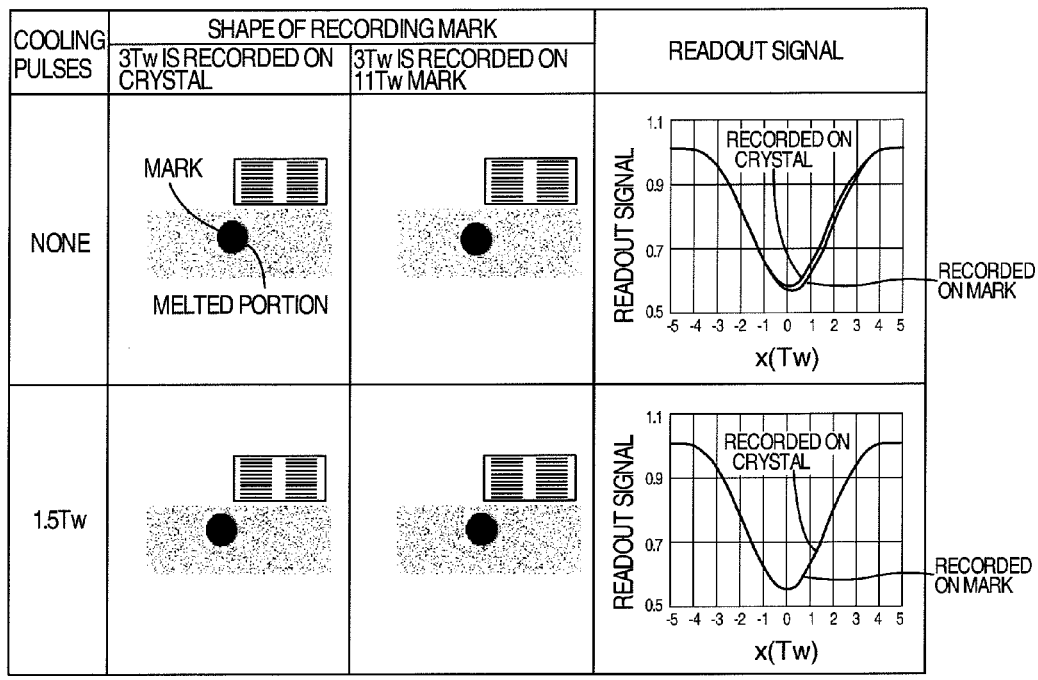
FIG. 10 is a diagram showing the results of a simulation in which 3-valued and 4-valued pulses were compared in terms of overwrite performance.

FIG. 10 shows the results of calculations of differences of the shape of marks and readout signals for first cases in which 3 Tw marks were recorded on unrecorded portions and for second cases in which 3 Tw marks were made to overwrite 11 Tw marks. The first cases include a case in which there were cooling pulses and a case in which there were no cooling pulses. Also, the second cases include a case in which there were cooling pulses and a case in which there were no cooling pulses. The upper part of FIG. 10 shows the results of the write strategy of FIG. 6. As can be seen from the figure, where 3 Tw marks were made to overwrite 11 Tw marks, the trailing edge of the mark extended rearwardly unlike the case in which 3 Tw marks were recorded on unrecorded portions of the crystal. With respect to the leading edges, the difference between both strategies was smaller. On an actual disk, a new data signal is overwritten with no correlation with the underlying base signal. Therefore, shifts of the trailing edges appearing here are produced at random, increasing jitters at the trailing edges.

The lower part of FIG. 10 shows the results of writing by the write strategy of FIG. 5. Because of addition of cooling pulses, the differences between the positions of the trailing edges of 3 Tw marks were reduced. It can be expected that the overwrite jitter will be improved.

Figure 11:
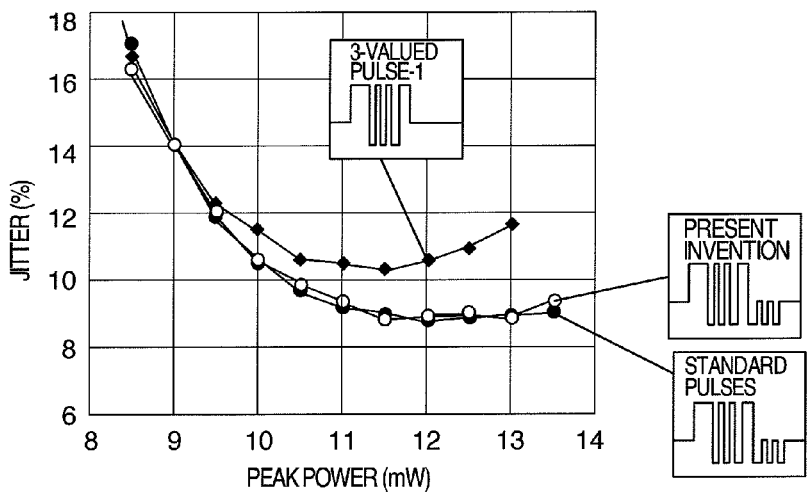
FIG. 11 is a graph showing the results of experiments showing the relationship between write power and jitter.

FIG. 11 shows the results of an experiment indicating the relationship between peak power and jitter in a case where a 8-16 modulated random data signal is overwritten. The width and power of the write strategy of FIG. 5 denoted by the standard pulses were set to 2.0 Tw and 4.6 Tw, respectively. In the case of the write strategy of the present invention shown in FIG. 1, the duty cycle of the cooling assisting pulse train was set to 23/32 Tw. The other power conditions are the same as the conditions described previously. Comparison with the write strategy of FIG. 6 denoted by "3-valued Pulse-1" has confirmed that the write strategy of the present invention produces a jitter value equivalent to the jitter value obtained when the standard pulses are used.

In this way, good writing characteristics could be obtained by the write strategy not using a power control system dedicated to cooling pulses. Consequently, the scale of the circuit of the laser driver IC and the number of signal lines on the FPC could be reduced.

Good writing characteristics can be obtained by a write strategy not using a power control system dedicated to cooling pulses by the use of recording method, laser driving apparatus, and optical disk drive using them. A small-sized, low-cost, low-power consumption optical disk drive can be offered.

The present invention is hereinafter described in detail using its embodiments.

Embodiment 1

Recording Method

Figure 12:
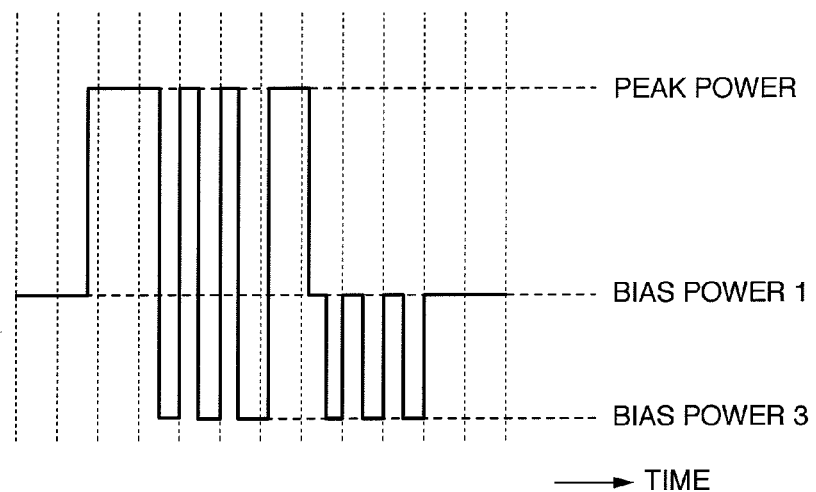
FIG. 12 is a graph illustrating another writing method according to the present invention.

FIG. 12 shows an embodiment in which another form of write strategy of the present invention is shown. The difference between the write strategies of FIGS. 12 and 1 is that a cooling assisting pulse train starts immediately after the end of the last pulse. Where the thermal diffusion from the medium is large compared with the rise/fall time of the waveform of emitted laser light (e.g., where the write speed is low or where the thermal conductivity of the recording medium is large), the cooling rate can be reduced by this method. The temperature of the recording film can be prevented from decreasing to below the optimum temperature range shown in FIG. 9.

Embodiment 2

Laser Driving Apparatus

Figure 3:
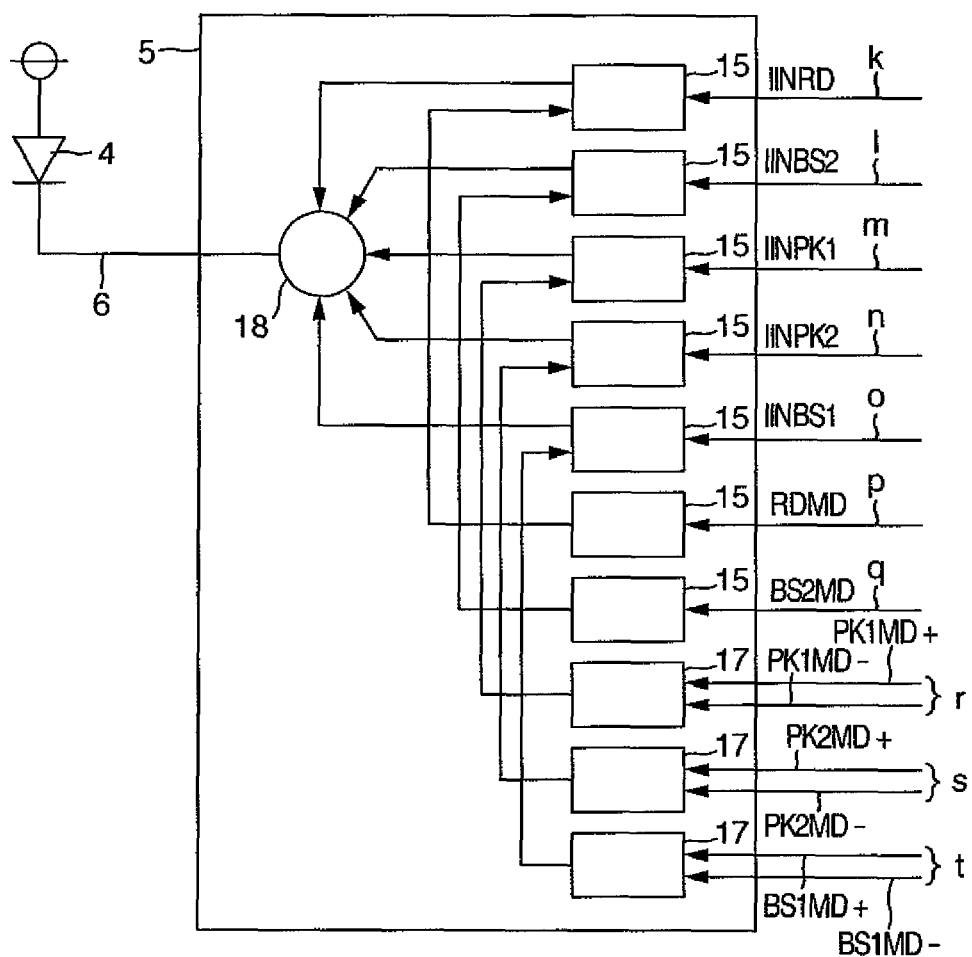
FIG. 3 is a circuit diagram of a well-known laser driving apparatus.
Figure 4:
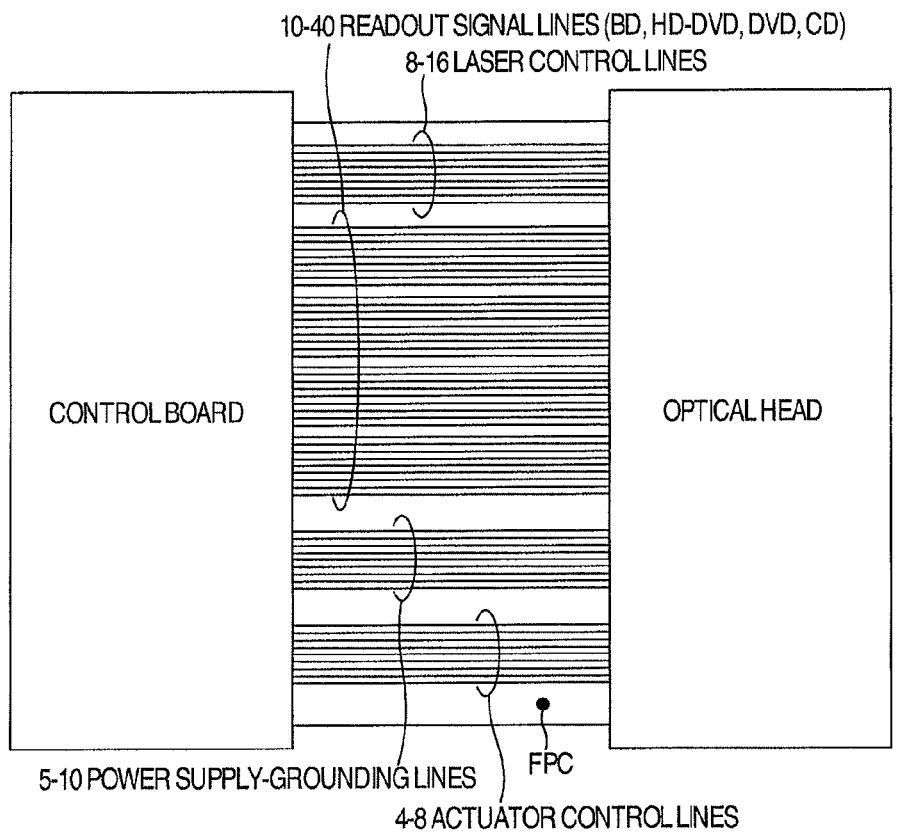
FIG. 4 is a schematic diagram of signal lines of an optical disk drive.
Figure 13:
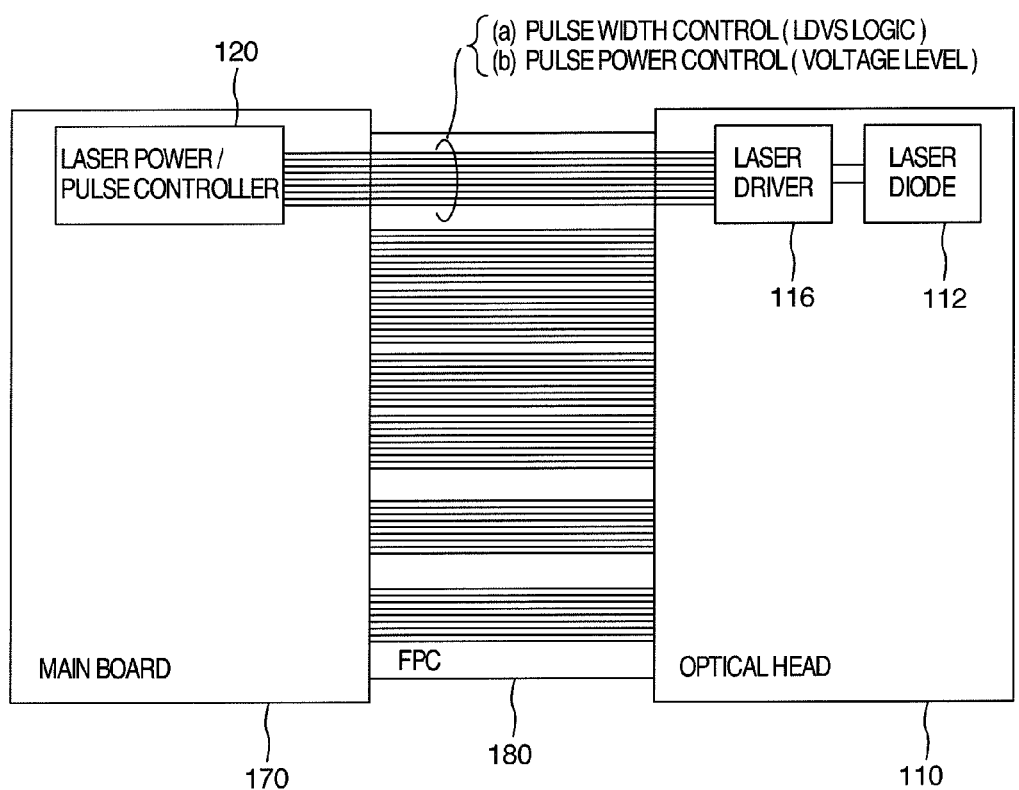
FIG. 13 is a diagram showing the configuration of a laser driving apparatus according to the present invention.

FIG. 13 is a schematic diagram showing the structure of a laser driving apparatus of the present invention. In the figure, a laser power/pulse controller 120 is mounted on a main board 170. A laser driver 116 and a semiconductor laser (laser diode) 112 are mounted on an optical head 110. The laser driver 116 is designed to incorporate the plural current switches shown in FIG. 3. (a) ON/OFF instructions for the current switches (pulse conditions) are sent from the laser power/pulse controller 120 to the laser driver 116 via an FPC 180 by an LDVS method. (b) The amount of currents to be fed to the current switches (power conditions) are sent as an analog voltage level from the laser power/pulse controller 120 to the laser driver 116 via the FPC 180. The laser power/pulse controller 120 has functions of precisely controlling the various signals and achieving the write strategy of the present invention shown in FIGS. 1 and 12.

Embodiment 3

Optical Disk drive

Figure 14:
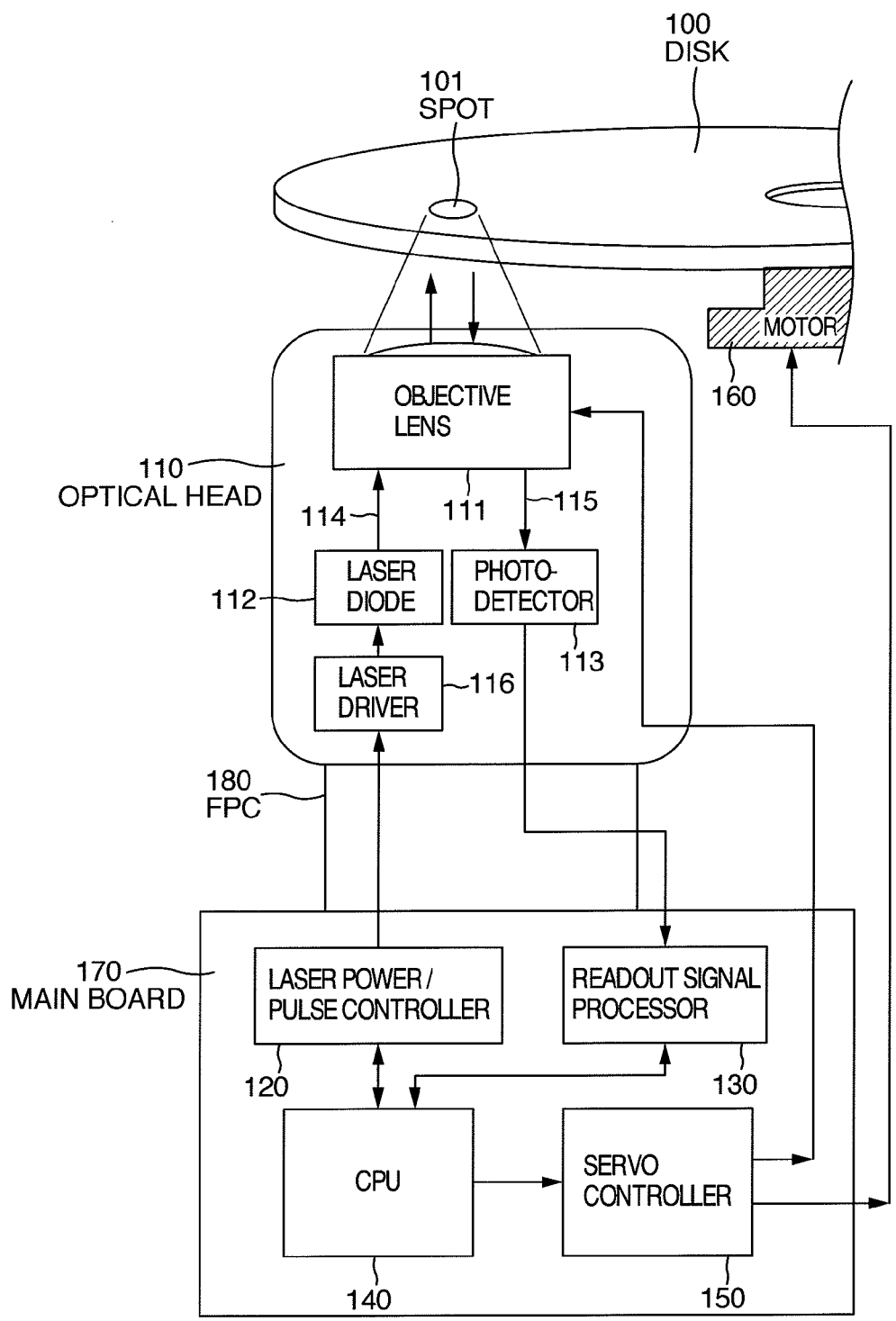
FIG. 14 is a diagram showing the configuration of an optical disk according to the present invention.

FIG. 14 is an embodiment showing the structure of an optical disk drive of the present invention. An optical disk medium 100 is rotated by a motor 160. During playback, a controller 120 for laser power level and pulse width controls the electrical current supplied to a semiconductor laser 112 via a laser driver 116 incorporated within an optical head 110 such that a light power instructed by a CPU 140 is achieved, and produces laser light 114. The laser light 114 is focused by an objective lens 111 and forms a light spot 101 onto the optical disk medium 100. Reflected light 115 from the light spot 101 is detected by a photodetector IC 113 via the objective lens 111. The photodetector IC is made up of plural split photodetectors. A readout signal processing circuit or signal processor 130 reproduces information recorded on the optical disk medium 100 using the signal detected by the optical head 110. During recording, the laser power/pulse controller 120 converts given recorded data into a given recorded pulse current and sends an instruction signal to the laser driver 116. The laser power/pulse controller 120 controls the semiconductor laser 112 to emit pulsed light from it. Because of the structure described so far, an optical disk apparatus of the present invention can be offered.

The present invention can be used for recording method, laser driving apparatus, and optical disk drive for recording data onto a recordable optical disk medium.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of recording information on an optical disk medium prerecorded with leading edge positions and trailing edge positions of plural pulses and values of power levels of the pulses as recommended recording conditions,
    wherein said plural pulses include a first pulse, multiple intermediate pulses, a last pulse, and cooling pulses,
    wherein the power levels of the plural pulses are respectively a peak power for recording, a power level being a first bias power and used for erasure, and a bottom power level of said multiple intermediate pulses being a second bias power lower than the first bias power,
    wherein a pulse train of the peak power and the second bias power level is repeatedly applied as said intermediate pulses, and
    wherein a pulse train modulated between the first bias power level and the second bias power level is applied as said cooling pulses.

2. A laser driving apparatus for controlling light emission from a laser light source to record information on an optical disk medium prerecorded with leading edge positions and trailing edge positions of plural pulses and values of power levels of the pulses as recommended recording conditions,
    wherein said plural pulses include a first pulse, multiple intermediate pulses, a last pulse, and cooling pulses,
    wherein the power levels of the plural pulses are respectively a peak power for recording, a power level being a first bias power and used for erasure, and a bottom power level of said multiple intermediate pulses being a second bias power lower than the first bias power, wherein a pulse train of the peak power and the second bias power level is repeatedly applied as said intermediate pulses, and wherein a pulse train modulated between the first bias power level and the second bias power level is applied as said cooling pulses.

3. An optical disk drive capable of recording information on an optical disk medium prerecorded with leading edge positions and trailing edge positions of plural pulses and values of power levels of the pulses as recommended recording conditions, wherein said plural pulses include a first pulse, multiple intermediate pulses, a last pulse, and cooling pulses, wherein the power levels of the plural pulses are respectively a peak power for recording, a power level being a first bias power and used for erasure, and a bottom power level of said multiple intermediate pulses being a second bias power lower than the first bias power, wherein a pulse train of the peak power and the second bias power level is repeatedly applied as said intermediate pulses, and wherein said optical disk drive is equipped with a laser driving apparatus having a function of applying a pulse train modulated between the first bias power level and the second bias power level as said cooling pulses.

* * * * *